United States Patent [19]

Heath et al.

[11] 4,099,673

[45] Jul. 11, 1978

[54] SPRAY GUN DEVICE

[75] Inventors: Allan B. Heath; Eugene E. Wolfe, both of Port Huron, Mich.

[73] Assignee: Acheson Industries, Inc., Port Huron, Mich.

[21] Appl. No.: 702,498

[22] Filed: Jul. 12, 1976

[51] Int. Cl.² .............................................. B05B 7/04
[52] U.S. Cl. .................................. 239/415; 137/625.4; 239/416; 239/416.1; 239/431; 239/526; 239/583
[58] Field of Search ............... 239/304, 305, 307, 311, 239/353, 369, 413–415, 416.1, 429–431, 433–434.5, 583, 574, 527, 528; 137/625.4, 625.48

[56] References Cited

U.S. PATENT DOCUMENTS

| | | | |
|---|---|---|---|
| 1,045,266 | 11/1912 | De Vilbiss | 239/527 X |
| 1,380,866 | 7/1921 | Day | 239/526 X |
| 1,442,814 | 1/1923 | Long | 239/415 |
| 2,910,248 | 10/1959 | Kueter et al. | 239/415 |
| 3,066,873 | 12/1962 | Flick et al. | 239/415 |
| 3,111,980 | 11/1963 | Spies | 239/581 X |
| 3,338,523 | 8/1967 | Tibbitt | 239/413 X |
| 3,352,333 | 11/1967 | Glasgow et al. | 239/415 X |
| 3,883,077 | 5/1975 | Showalter | 239/415 |

*Primary Examiner*—Bruce H. Stoner, Jr.
*Assistant Examiner*—Andres Kashnikow
*Attorney, Agent, or Firm*—Harness, Dickey & Pierce

[57] ABSTRACT

There is disclosed herein a spray gun particularly adapted for heavy duty use in applying a variety of fluids to the working surfaces of dies, molds, or other like forming apparatus. The spray gun comprises a main body housing adapted for the connection of compressed air and other fluid supply lines and having a single axially movable double action valve disposed therein which is adapted to selectively control both the flow of compressed air and other desired fluids. The double action valve is actuated by a lever arm connected to the body portion and engaging a portion of the valve member. A delivery tube is connected to the discharge end thereof for transmitting and directing the fluid or fluids to the surface to be sprayed.

23 Claims, 4 Drawing Figures

U.S. Patent  July 11, 1978  4,099,673
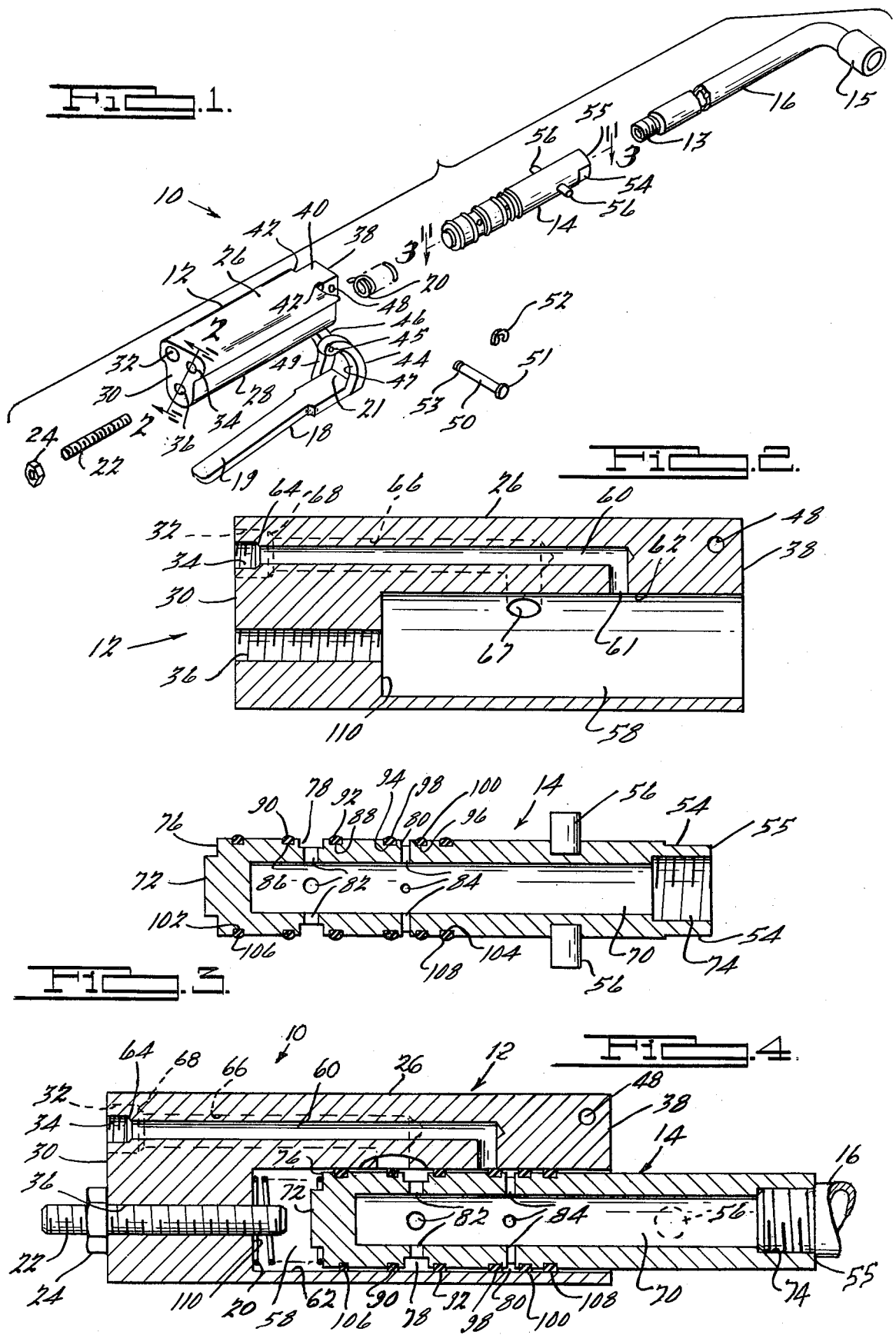

SPRAY GUN DEVICE

BACKGROUND AND SUMMARY OF THE INVENTION

This invention relates generally to spray gun assemblies and more particularly to such spray gun assemblies which are adapted for heavy industrial use in applying various fluids to the working surfaces of molds, dies or other similar forming apparatus.

The State of the Art is shown by the following patent and other publications and technical data sheets:

U.S. Pat. No. 2,953,305 issued Sept. 20, 1960 to Bondurant;
Paasche Airbrush Co., Catalog No. 7165 available from Paasche Airbrush Co., 1909 Diversey Parkway, Chicago, Ill. 60614;
Acheson Product Data Sheet for Dag Handgun Models 090, 086, and 098 available from Dag Engineering B. V., P. O. Box 8, Scheemda, Holland;
Rimrock Corp. data sheets for Handgun Models, 090, 080, 081, 082, 083, and 084 available from Rimrock Corp., 1700 Rimrock Road, Columbus, Ohio 43219; and, W. E. Lang product data sheets for type A, B, C, AW, BW, and CW spray guns available from W. E. Lang, 6523 Nottingham, St. Louis, Mo. 63109.

In many industrial forming processes, such as, the molding, die-casting, drawing, and forging of various metals or other similar materials, it is necessary to apply a lubricant to the working surfaces of such dies or other forming apparatus between machine-cycle operations. Also, it is often desirable to blow air across these working surfaces to remove scale, sediment or other impurities which may have remained adhered thereto from previous operational cycles. Further, the application of air and lubricant to these working surfaces tends to cool the dies between operational cycles thereby prolonging the life of the dies. In certain cases it may also be desirable to apply a suitable release agent to promote removal of the finished article upon completion of the operational cycle.

Various types of hand operated spray guns have been developed for these applications, all of which employ separate valve mechanisms to control each of the fluids to be applied. These separate valves may be either operated by a single lever arm coupled to each valve or by separate lever arms for actuation of either valve independently of the other. Such devices thus require separate valve chambers for each fluid being dispensed, a valve core member for each chamber and appropriate seals for each valve all of which serve to make such devices relatively expensive to manufacture. This duplication of parts also increases the weight of such spray guns thus making them more difficult and cumbersome for an operator to handle as well as contributing substantially to operator fatigue. Further, as the number of seals and other moving parts is necessarily increased, maintenance and repair costs of such multiple valve devices may be comparatively high. Also, as such hand spray guns are subjected to extremely adverse environmental conditions during use due to the nature of this foundry-type work and the proximity to high temperatures, these additional moving parts increase the potential for failure of the device, which may require shutting down a machine until repairs or replacement can be accomplished.

Accordingly, it is an object of the present invention to provide a manually operated spray gun which minimizes the number of moving parts required while affording the operational flexibility provided by multiple valved spray guns.

It is also an object of the present invention to provide a manually operated spray gun which is economical to construct, extremely durable in operation, and minimizes repair and maintenance costs.

It is a further object of the present invention to provide a spray gun employing fewer moving parts and associated support structure which is therefore lighter in weight, easier to use, and substantially reduces operator fatigue.

It is a still further object of the present invention to provide a spray gun which allows selective application of single fluids or simultaneous application of two or more fluids.

It is yet another object of the present invention to provide a spray gun which is relatively simple in construction thereby minimizing the potential failure.

Other objects, features and advantages of the present invention will become apparent from the subsequent description and the appended claims taken in conjunction with the accompanying drawings.

BRIEF DESCRIPTION OF THE DRAWINGS

FIG. 1 is an exploded perspective view of the spray gun device of the present invention;

FIG. 2 is a view of the main body housing of the spray gun device of FIG. 1 shown in section, taken along line 2—2 of FIG. 1;

FIG. 3 is a sectional view of the valve core of the spray gun device of FIG. 1 taken along line 3—3 of FIG. 1; and, FIG. 4 is a sectionalized view of the assembled spray gun device showing the valve core in an air only operational mode.

DETAILED DESCRIPTION OF THE PREFERRED EMBODIMENT

Referring now to FIG. 1 there is shown a spray gun device in accordance with the present invention indicated generally at 10. Spray gun device 10 is comprised of a main body housing 12, a valve core 14, an extension tube 16, an operating lever arm 18, a helical coil spring 20, set screw 22 and jam nut 24.

Main body housing 12 is comprised of an elongated member having an irregular cross-sectional shape generally as shown adapted to afford a comfortable handgrip and including a relatively wide top portion 26 and a narrower bottom portion 28 with smoothly curving sidewalls extending therebetween. Preferably, main body housing 12 will be fabricated from a light weight metal such as by casting or machining it from an aluminum alloy, although various other materials may be used in place thereof. In certain applications, it may even be possible to employ a high impact plastic composition should this be desirable. The outer shape of main body housing 12 may be varied from this configuration to any other desired shape, but will generally be designed to afford a comfortable handgrip for operating the device as well as providing an extremely rugged and durable case for housing and protecting the various parts described below.

Main body housing 12 has a rear end wall portion 30 in which there is provided three apertures 32, 34, and 36. Apertures 32 and 34 are located adjacent top portion 26 and extend substantailly parallel to each other longitudinally into main body housing 12. Aperture 32 is adapted for connection of a first fluid supply line such as a compressed air supply line and is substantailly larger than aperture 34 which is adapted for connection of another fluid supply line such as a suitable lubricant . It should be noted that the word lubricant as used herein is intended to include a broad range of fluids including lubricants, release agents or any other fluids which are to be applied to the working surfaces of dies or molds. Aperture 36 is disposed in end portion 30 between and below apertures 32 and 34 and is provided with internal threads to accommodate set screw 22 as described in greater detail below.

Top portion of main body housing 12 has a reduced width portion 40 adjacent forward end portion 38 and a pair of forward facing curved surfaces 42 on either side thereof. Curved surfaces 42 are of a size and shape so as to movably accommodate a pair of spaced apart substantially parallel arms 44 and 46 provided on lever 18. A laterally extending bore 48 is provided in reduced width portion 40 which is adapted to accommodate pin 50 which also passes through aperture 45 in arm 44 and a corresponding aperture (not shown) in arm 46, thereby rotatably attaching arms 44 and 46 of lever arm 18 to main body housing 12 as described in greater detail below.

Lever arm 18 is comprised of a handle portion 19 suitably shaped to allow comfortable engagement by an operator's hand which extends back from a slightly wider interconnecting portion 21 extending between upward projecting arms 44 and 46. An aperture 45 is provided at the terminal end of arm 44 and a similar aperture (not shown) is provided in a like location on arm 46 which are adapted to receive pin 50 so as to allow lever arm 18 to be rotatably secured to main body housing 12 as previously mentioned. Pin 50 has an enlarged diameter head 51 which prevents it from passing completely through aperture 45 and a split ring spring fastener 52 engages an annular groove 53 on pin 50 thereby retaining it in position. However, it should be noted that any other suitable fastening means may be substituted for pin 50.

Valve core member 14 is generally cylindrical in shape having a pair of flat portions 54 provided on opposite sides adjacent end 55 thereof, which are adapted to allow a wrench to engage valve core member 14 so as to prevent rotation thereof when attaching extension tube 16 thereto as described below. A pair of follower pins 56 project outwardly from opposite sides of valve core member 14 and are adapted to engage surfaces 47 and 49 of arms 44 and 46 of lever arm 18 so as to allow actuation of the spray device. Valve core 14 is preferably machined from brass due to its ability to resist corrosion from the various fluids being applied, however, any other suitable material may be substituted therefore.

Extension tube 16 is comprised of a hollow elongated tube having one end 13 thereof threaded for attachment thereof to valve core 14 as described below. A short portion of rubber hose 15 is provided on the opposite end of extension tube 16 which serves as a bumper to protect the working surfaces of the die or mold from damage or scratching should extension tube 16 accidently come into contact therewith. Extension tube 16 may be fabricated from any suitable material, but preferably will be manufactured from a relatively soft material so as to insure against scratching or otherwise damaging the die or mold. Various plastic compositions may be ideally suited for this application and should such a material be used it may be possible to eliminate rubber hose portion 15.

Referring now to FIG. 2, the main body housing 12 of the spray gun device 10 will be described in greater detail. Main body housing 12 has a relatively large diameter longitudinally extending bore 58 disposed in end portion 38 and extending a substantial distance along the length thereof which is adapted to receive valve core member 14. Threaded aperture 36 is coaxial with and of a substantially smaller diameter than bore 58 and as previously mentioned, extends inward from end 30 so as to communicate with bore 58. Main body housing 12 also has a passageway 60 extending inward from aperture 34 and opening into bore 58 at 61 through sidewall 62 thereof. Aperture 34 is of a slightly larger diameter than passageway 60 and is provided with threads and an annular inclined wall portion 64 at its inner terminal end which is adapted to cooperate with conventional fluid supply line fittings so as to provide a sealing arrangement with such fittings. Similarly, a second passageway 66 extends inward from aperture 32 and opens into bore 58 through sidewall 62 at a position 67 spaced longitudinally apart from the opening 61 of passageway 60. Aperture 32 is also threaded and of a slightly larger diameter than passageway 66 and is provided with an annular inclined wall portion 68 which is adapted to allow the connection of conventional fluid supply lines and prevent leakage of fluid therefrom.

The valve core member 14 which is adapted to be inserted into bore 58 of main body housing 12 is best seen with reference to FIG. 3. As illustrated therein, valve core member 14 has an axially extending bore 70 extending inward from end 55 thereof and terminating just short of end portion 72. Bore 70 has a threaded enlarged diameter portion 74 extending a short distance inward from end 55 into which extension tube 16 is threadably inserted. These threads will generally be of the tapered type conventionally used in various pipe fitting applications so as to insure against fluid leakage between portion 74 and extension tube 16, however, conventional threads may be substituted, therefore, should this be desirable. End portion 72 of valve core member 14 is provided with an annular shoulder 76 which forms a retaining seat for a helical coil spring 20 which serves to bias valve core 14 out of bore 58 and into a closed position.

Valve core 14 also has a pair of spaced apart annular grooves 78 and 80 provided thereon. Groove 78 is substantially wider than groove 80 and has a plurality of radially extending apertures 82 passing between the bottom of groove 78 and bore 70. Similarly, groove 80 also has a plurality of radially extending apertures 84 passing between the bottom thereof and bore 70. A pair of shallow annular grooves 86 and 88 are provided on the circumference of valve core 14 immediately adjacent opposite longitudinal sides of groove 78 in which are disposed sealing means 90 and 92. Similarly, a pair of shallow annular grooves 94 and 96 are provided immediately adjacent opposite longitudinal edges of groove 80 and have sealing means 98 and 100 disposed therein. Additional shallow annular grooves 102 and 104 each having sealing means 106 and 108 respectively provided therein are provided on the circumference of valve core member 14, groove 102 being disposed adjacent end portion 72 and groove 104 being located between end portion 55 and groove 96. Each of these sealing means will preferably be in the form of conventional "O" rings fabricated from a suitable material which is compatible with the fluids being sprayed. Alternatively, any other suitable gasket sealing means may be substituted any other suitable gasket sealing means may be substituted therefore.

The operational relationship of these parts is best seen and will be described with reference to FIG. 4 in which the spray gun of the present invention is operationally illustrated in section. As is readily apparent therefrom, valve core 14 is operatively disposed in bore 58 of main body housing 12 and is free to move axially therein. Helical coil spring 20 has one end seated on shoulder 76 of valve core 14 with the other end engaging the terminal end wall 110 of bore 58 so as to bias valve core member 14 in an axially outward direction relative to main body housing 12. Lever arm 18 is rotatably secured to main body housing 12 by means of pin 50 as previously described. When spray gun device 10 is assembled, arcuate surfaces 47 and 49 of lever arm, 44 and 46 will engage follower pins 56 provided on valve core 14. Thus, when handle portion 19 is drawn toward bottom surface 28, legs 44 and 46 will rotate about pin 50 and surfaces 47 and 49 engaging follower pins 56 will overcome the biasing force of spring 20 and cause valve core 14 to move axially inward within bore 58 of main body housing 12. When handle portion 19 of lever arm 18 is released, the biasing force of spring 20 will cause valve core member to move axially outward with respect to bore 58. As valve core member 14 extends outward between and beyond legs 44 and 46, center portion 21 of lever arm 18 will limit the outward travel of valve core 14 as its engagement with the outer peripheral surface of valve core 14 will prevent its rotation beyond this point.

As illustrated in FIG. 4, the spaced apart relationship of the openings 61 and 67 of passageway, 60 and 66 respectively into bore 58 correspond approximately to the spaced apart relationship of annular grooves 78 and 80 on valve core 14. As previously mentioned, however, passageway 66 is of a larger diameter than passageway 60 and annular groove 78 is wider than annular groove 80. The combined effect of these differences in relative size is to provide a position to which valve core 14 may be axially moved at which passageway 66 and annular groove 78 will be in communication; yet passageway 60 and annular groove 80 will be sealed from one another by sealing means 98 thereby allowing the flow of only one of the two possible fluids such as compressed air, for example. This feature then allows the operator to partially depress handle 19 of lever arm 18 thereby causing valve core 14 to move axially inward to a position as illustrated in FIG. 4 allowing only compressed air to flow so as to blow scale or other dirt or debris from the working surfaces of the die or mold. Thereafter, the operator may fully depress handle 19 of lever arm 18 causing valve core 14 to move further axially into bore 58 so as to allow both grooves 78 and 80 to communicate with respective passageways 66 and 60. In this position both compressed air and some other desired fluid such as a suitable lubricant, will flow through passageways 66 and 60 to grooves 78 and 80, through apertures 82 and 84 respectively into bore 70 of valve core 14 where they will be intermixed as they travel outward along bore 70 and extension tube 16. Thus, the operator will be able to spray a lubricant, onto the working surfaces of the die or mold after having first cleaned the surfaces of the blast of compressed air.

When valve core 14 is in its axially extended or off position relative to main body housing 12, it will be noted that seals 106 and 90 will cooperate with sidewall portion 62 of bore 58 to seal off passageway 66, and in the like manner seals 92 and 98 will also cooperate with side wall 62 to seal off passageway 60 thereby preventing the leakage of fluid from the spray gun. When valve core 14 is in an axially inward or on position, seals 90 and 92 will cooperate with side wall portion 62 to insure the fluid passing through passageway 66 enters bore 70 of valve core 14 and similarly seals 98 and 100 will cooperate with side wall 62 to insure the fluid flowing through passageway 60 enters bore 70 thereby preventing premature mixing of the respective fluids and further insuring against leakage of either of these fluids. Seal 108 is provided to cooperate with side wall 62 so as to further insure against leakage of fluids between wall 62 and the periphery of valve core 14 should any of the other seals become worn or in the event seal 100 is accidently moved inward beyond the opening of passageway 60 into bore 58.

Set screw 22 threadably disposed in aperture 36 extends into bore 58 and is adapted to engage end portion 72 of valve core 14 so as to provide an adjustable stop limiting the axially inward movement of valve core 14. Thus, by adjusting the position of set screw 22 within aperture 36 relative to main body housing 12, the operator can vary the degree of communication of passageways 60 and 66 with respective grooves 80 and 78 thereby allowing a regulation of the fluid flow therethrough. Jam nut 24 is provided on set screw 22 and is adapted to engage end 30 of main body housing 12 so as to create a localized tension on set screw 22 thereby securing it in position once it has been properly adjusted.

As previously mentioned, extension tube 16 is secured to end 55 of valve core 14 through the cooperation of threads 74 and 15. Extension tube 16 is hollow and may be of any desired length suitable for the application for which the spray gun device is provided and serves merely to direct the fluids being sprayed onto the surfaces intended to be coated thereby. While FIG. 1 illustrates an extension tube having a single nozzle of port positioned at a right angle to the body portion of the tube, this arrangement is for purposes of illustration only. Extension tube 16 may be fabricated with any desired configuration suitable for its intended application and additionally, may be provided with a plurality of nozzle ends or ports so as to allow multi-directional spraying should this be desirable.

Thus, the present invention provides a heavy duty spray gun device suitable for use in applying a variety of fluids to the working surfaces of dies or molds which substantially reduces the number of moving parts which are subject to wear and failure thereby reducing the manufacturing costs of such devices while improving the reliability thereof. Also, the use of a single double action valve in the present invention reduces the weight of the spray gun which is an important feature as such guns are hand-operated and may be fitted with extremely long extension tubes making them cumbersome to handle. It should also be noted that the principles employed in this double action valve may be expanded to allow the spraying of more than two fluids by merely providing additional connections, passageways, and properly positioned annular grooves.

While it will be apparent that the preferred embodiment of the invention disclosed is well calculated to fulfill the objects above stated, it will be appreciated that the invention is susceptible to modification, variation, and change without departing from the proper scope or fair meaning of the subjoined claims.

We claim:

1. In a spray gun device for applying lubricants to the working surfaces of forming apparatus the improvement comprising:
   a main body housing having an elongated bore provided in one end thereof;
   an elongated valve core member movably disposed within said bore and extending outwardly from said one end of said housing and adapted to selectively control the flow of two or more fluids through said spray gun;
   actuating means for selectively moving said valve core member relative to said main body housing;
   adjustable means adapted to engage a portion of said valve core member so as to limit the movement of said valve core member in one direction;
   at least first and second fluid passageways provided in said main body housing, first and second fluid inlet passageways provided on said valve core member, said valve core member being continuously movable between an off position in which said first and second fluid inlet passageways do not communicate with said first and second fluid passageways thereby preventing the flow of fluids through said spray gun to a first position in which only said first fluid passageway communicates with said first fluid inlet passageway and to a second position in which both said first and second fluid passageways communicate with respective of said first and second fluid inlet passageways;
   a single longitudinal fluid outlet passageway provided in said valve core member and communicating with each of said first and second fluid inlet passageways; and
   said first fluid inlet passageway comprises an annular groove provided on the periphery of said valve core member and a plurality of inwardly extending apertures extending from said groove to said fluid outlet passageway, and said second fluid inlet passageway comprises a second annular groove provided on the periphery of said valve core member and a plurality of inwardly extending apertures extending from said groove to said fluid outlet passageway, said first and second annular grooves being spaced apart a predetermined distance.

2. A spray gun device as set forth in claim 1 wherein said sealing means includes a first pair of annular seals disposed on said valve core member immediately adjacent and on opposite sides of said first annular groove, a second pair of annular seals disposed on said valve core member immediately adjacent and on opposite sides of said second annular groove and an annular end seal disposed on said valve core member immediately adjacent one end thereof, said end seal and one of said first pair of annular seals cooperating to prevent fluid leakage from said first fluid passageway when said valve core member is in said off position and one of said second pair of annular seals and another of said first pair of annular seals cooperating to prevent fluid leakage from said second fluid passageway when said valve core member is in said off position.

3. A spray gun device as set forth in claim 1 wherein said valve core member is disposed in a longitudinally extending bore provided in said main body housing, said first and second fluid passageways opening into said bore in a spaced apart relationship, said spaced apart relationship being equal to said predetermined distance.

4. A spray gun device as set forth in claim 2 wherein said first fluid passageway has a diameter greater than said second fluid passageway and said first annular groove has a width greater than said second annular groove so as to allow said first fluid passageway and said first annular groove to move into mutual communication while said second fluid passageway and annular groove remain out of communication when said valve core is moved to said first position.

5. In a spray gun device for applying lubricants to the working surfaces of forming apparatus the improvement comprising:
   a main body housing having an elongated bore extending inward from one end thereof;
   an elongated valve core member disposed within said bore and having a portion continuously extending outwardly from said one end of said housing and adapted to be movable into and out of said housing;
   fluid conducting means secured to one end of said valve core member;
   a lever arm rotatably secured to said main body housing and engaging said outwardly extending portion of said valve core so as to cause said valve core to move into said housing in response to rotation thereof;
   biasing means engaging and urging said valve core member out of said housing;
   means provided in said housing for limiting the inward movement of said valve core member;
   at least first and second fluid passageways provided in said main body housing, first and second fluid inlet passageways provided on said valve core member, said valve core member being continuously movable from an outwardly biased off position in which said first and second fluid inlet passageways do not communicate with said first and second fluid passageways thereby preventing the flow of fluids through said spray gun inwardly to a first position in which only said first fluid passageway communicates with said first fluid inlet passageway and to a second position in which both said first and second fluid passageways communicate with respective of said first and second fluid inlet passageways.

6. A spray gun device as set forth in claim 5 wherein said valve core member is adapted to allow increasing rates of flow of fluids within said first and second fluid and fluid inlet passageways as it is caused to move from said off position to said second position.

7. A spray gun device as set forth in claim 6 wherein said means limiting inward movement of said valve core member is adjustable and includes a threaded aperture extending into said housing and a set screw passing through said aperture and adapted to be axially movable into and out of said housing thereby limiting the inward movement of said valve core and a jam nut provided on said set screw so as to secure said set screw in a predetermined position.

8. A spray gun device as set forth in claim 6 further comprising a plurality of sealing means provided on said valve core member, said sealing means engaging a portion of said main body housing to prevent fluid leakage from said spray gun device and between said first and second fluid and fluid inlet passageways.

9. A spray gun device as set forth in claim 8 wherein said valve core member is cylindrical and has a single longitudinal fluid outlet passageway communicating with each of said first and second fluid inlet passageways and a fluid conducting means secured to one end of said valve core member for directing said fluid from said outlet passageway to said working surfaces.

10. In a spray gun device for applying lubricants to the working surfaces of forming apparatus the improvement comprising:
a main body housing having an elongated bore extending inward from one end thereof;
an elongated valve core member disposed within said bore and extending outwardly from said one end of said housing and adapted to be movable into and out of said housing;
fluid conducting means secured to one end of said valve core member;
a lever arm rotatably secured to said main body housing and engaging a portion of said valve core so as to cause said valve core to move into said housing in response to rotation thereof;
biasing means engaging and urging said valve core member out of said housing;
adjustable means provided in said housing for limiting the inward movement of said valve core member;
at least first and second fluid passageways provided in said main body housing, first and second fluid inlet passageways provided on said valve core member, said valve core member being continuously movable between an off position in which said first and second fluid inlet passageways do not communicate with said first and second fluid passageways thereby preventing the flow of fluids through said spray gun to a first position in which only said first fluid passageway communicates with said first fluid inlet passageway and to a second position in which both said first and second fluid passageways communicate with respective of said first and second fluid inlet passageways,
said valve core member is cylindrical and has a single longitudinal fluid outlet passageway communicating with each of said first and second fluid inlet passageways and a fluid conducting means secured to one end of said valve core member for directing said fluid from said outlet passageway and is adapted to allow increasing rates of flow of fluids within said first and second fluid and fluid inlet passageways as it is caused to move from said off position to said second position,
a plurality of sealing means provided on said valve core member, said sealing means engaging a portion of said main body housing to prevent fluid leakage from said spray gun device and between said first and second fluid and fluid inlet passageways; and
said first fluid inlet passageway comprises an annular groove provided on the circumference of said valve core member and a plurality of radial apertures extending from said groove to said fluid outlet passageway, and said second fluid inlet passageway comprises a second annular groove provided on the circumference of said valve core member and a plurality of radial apertures extending from said groove to said fluid outlet passageway, said first and second annular grooves being spaced apart a predetermined distance.

11. A spray gun device as set forth in claim 10 wherein said sealing means includes a first pair of annular seals disposed on said valve core member immediately adjacent and on opposite side of said first annular groove, a second pair of annular seals disposed on said valve core member immediately adjacent and on opposite sides of said second annular groove and an annular end seal disposed on said valve core member immediately adjacent one end thereof, said end seal and one of said first pair of annular seals cooperating to prevent fluid leakage from said first fluid passageway when said valve core member is in an off position and one of said second pair of annular seals and another of said first pair of annular seals cooperating to prevent fluid leakage from said second fluid passageway when said valve core member is in said off position.

12. A spray gun device as set forth in claim 11 wherein said valve core member is disposed in a longitudinally extending bore provided in said main body housing, said first and second fluid passageways opening into said bore in a spaced apart relationship, said spaced apart relationship being equal to said predetermined distance.

13. A spray gun device as set forth in claim 11 wherein said sealing means are "0" rings disposed in shallow grooves provided in said valve core member.

14. A spray gun device for applying lubricants to the working surfaces of forming apparatus comprising:
an elongated housing having a longitudinally extending bore opening inwardly from one end thereof;
a first longitudinally extending fluid inlet passageway radially spaced from said bore opening inwardly from another end of said housing;
a seconnd longitudinally extending fluid inlet passageway opening inwardly from said another end of said housing and radially spaced from said bore and spaced from said first longitudinal passageway;
first and second radial fluid inlet passageways connecting the inner end of respective of said first and second longitudinal fluid inlet passageways with said bore;
a valve core member movably disposed within said bore, and having one end continuously projecting outwardly from said one end of said housing;
a lever arm rotatably secured to said elongated housing and engaging a portion of said valve core member so as to cause said valve core to move inwardly with respect to said housing in said bore in response to rotation of said lever arm;
biasing means engaging and urging said valve core member out of said bore;
adjustable means provided in said housing for limiting the inward movement of said valve core member;
a longitudinally extending fluid outlet passage provided in said valve core member and opening out said outwardly projecting end of said valve core member; and
passage means in said valve core member for placing selected of said first and second radial passageways in fluid communication with said valve core member fluid outlet passage as said valve core member is moved inwardly with respect to said housing.

15. A spray gun device as set forth in claim 14 further comprising a plurality of sealing means provided on said valve core member, said sealing means engaging a portion of said elongated housing to prevent fluid leakage from said spray gun device and between said first and second radial fluid inlet passageways.

16. A spray gun device for applying lubricants to the working surfaces of forming apparatus comprising:
an elongated housing having a longitudinally extending bore opening inwardly from one end thereof;
p1 a first longitudinally extending fluid inlet passageway radially spaced from said bore opening inwardly from another end of said housing;
a second longitudinally extending fluid inlet passageway opening inwardly from said another end of said housing and radially spaced from said bore and spaced from said first longitudinal passageway;
first and second radial fluid inlet passageways connecting the inner end of respective of said first and second longitudinal fluid inlet passageways with said bore;
a valve core member movably disposed within said bore, and having one end projecting outwardly from said one end of said housing;
a lever arm rotatably secured to said elongated housing and engaging a portion of said valve core member so as to cause said valve core to move inwardly with respect to said housing in said bore in response to rotation of said lever arm;
biasing means engaging and urging said valve core member out of said bore;
adjustable means provided in said housing for limiting the inward movement of said valve core member;
a longitudinally extending fluid outlet passage provided in said valve core member and opening out said outwardly projecting end of said valve core member;
passage means in said valve core member for placing selected of said first and second radial passageways in fluid communication with said valve core member fluid outlet passage as said valve core member is moved inwardly with respect to said housing; and
said passage means in said valve core member comprising a first annular groove provided on the periphery of said valve core member and a plurality of inwardly extending apertures communicating between said groove and said fluid outlet passage, a second annular groove provided on the periphery of said valve core member and a plurality of inwardly extending apertures communicating between said groove and said fluid outlet bore, said first and second annular grooves being disposed on said valve core member so as to be brought into fluid communication with respective of said first and second radial fluid inlet passageways as said valve core member is moved inwardly with respect to said housing.

17. A spray gun device as set forth in claim 16, further comprising sealing means including a first pair of annular seals disposed on said valve core member immediately adjacent and on opposite sides of said first annular groove, a second pair of annular seals disposed on said valve core member immediately adjacent and on opposite sides of said second annular groove and an annular end seal disposed on said valve core member immediately adjacent another end thereof, said end seal and one of said first pair of annular seals cooperating to prevent fluid leakage from said first radial fluid inlet passageway when said valve core member is in said off position and one of said second pair of annular seals and another of said first pair of annular seals cooperate to prevent fluid leakage from said second radial fluid inlet passageway when said valve core member is in said off position.

18. A spray gun device as set forth in claim 16 wherein said first longitudinal and radial fluid inlet passageways have a diameter greater then said second longitudinal and radial fluid inlet passageways and said first annular groove has a width greater than said second annular groove so as to allow said first radial fluid inlet passageway and said first annular groove to move into mutual communication while said second radial fluid inlet passageway and said second annular groove remain out of fluid communication when said valve core member is moved inwardly to a first position from an outwardly biased off position.

19. A spray gun device as set forth in claim 18 wherein said first and second annular grooves are positioned relative to each other so as to allow said first annular groove to be in communication with said first radial fluid inlet passageway and said second annular groove to be in communication with said second radial fluid inlet passageway simultaneously when said valve core member is moved inwardly from said first position to a second position.

20. A heavy duty spray gun device adapted for use in applying lubricants to the working surfaces of forming apparatus comprising:
a main body housing having a longitudinally extending bore provided therein, connection means adapted for connection of a first and second fluid supply lines, a first fluid passageway opening into said bore for conducting a first fluid from said connection means to said bore, a second fluid passageway of a smaller diameter than said first fluid passageway opening into said bore at a position longitudinally spaced apart from said first fluid passageway opening a predetermined distance;
a cylindrical valve core disposed in said bore and longitudinally movable therein, said valve core having an axial bore extending inward from one end thereof, said bore having a threaded portion at said one end, a first annular groove provided on the circumference of said valve core member, a plurality of apertures extending radially between said first groove and said axial bore, a second annular groove provided on the circumference of said valve core member said second groove being narrower than said first groove and spaced apart from said first groove said predetermined distance, a plurality of apertures extending radially from said second groove to said axial bore, and an annular shoulder portion provided on another end of said valve core member;
spring biasing means disposed in said bore and engaging said shoulder portion so as to urge said valve core member out of said bore;
a pair of follower pins extending radially outward from said valve core member adjacent said one end thereof;
a lever arm having a pair of substantially parallel spaced apart arcuate members rotatably secured to said main body housing one of said pair of members adapted to engage each of said follower pins in such a manner as to cause said valve core member to move axially into said main body housing as said lever arm is rotated;
an extension tube threadedly engaging said one end of said axial bore and adapted to direct said fluids from said spray gun to said surfaces;
said valve core being axially movable within said bore from an off position in which fluid flow through said first and second fluid passageways is prevented to a second position in which said first fluid passageway and said first annular groove communicate thereby allowing only a first fluid to flow through said axial bore and said extension tube to a third position in which said first and second fluid passageways communicate with respective of said first and second annular grooves thereby allowing said first and a second fluid to flow through said axial bore and said extension tube and the rate of flow of said first and second fluids is dependent upon the degree of communication between respective of said first fluid passageway and first annular groove and said second fluid passageway and second annular groove; and, a set screw threadedly engaging and axially movable with respect to said main body housing and adapted to engage said another end of said valve core member when said valve core member is in said third position thereby limiting the degree of communication between said second fluid passageway and second annular groove.

21. A spray gun device for applying lubricants to the working surfaces of forming apparatus comprising:

an elongated housing having a longitudinally extending bore opening inwardly from one end thereof, said elongated housing having a cross sectional shape suitable to provide a comfortable hand grip for operating said spray gun device;

an elongated valve core member longitudinally movably disposed within said bore and extending outward from said one end of said housing for selectively controlling the flow of one or more fluids through said spray gun device;

an elongated lever arm rotatably secured adjacent said one end of said housing and engaging a portion of said valve core member so as to move said valve core member relative to said housing thereby selectively controlling said fluid flow, said lever arm being positioned with respect to said housing hand grip to enable an operator to grasp and rotate said lever arm toward said housing; and at least first and second fluid inlet passageways provided in said main body housing, first and second fluid inlet passageways provided on said valve core member, said valve core member having a single fluid outlet passage communicating with said first and second fluid inlet passages and being continuously movable from an outwardly biased off position in which said first and second fluid inlet passageways do not communicate with said first and second fluid passageways thereby preventing the flow of fluids through said spray gun and inwardly with respect to said main body housing to a first position in which only said first fluid passageway communicates with said first fluid inlet passageway and to a second position in which both said first and second fluid passageways communicate with respective of said first and second fluid inlet passageways.

22. A spray gun device as set forth in claim 21 further comprising biasing means disposed coaxial with said valve core member and extending between an inner end of said bore and an inwardly disposed end of said valve core member.

23. A spray gun device as set forth in claim 22 wherein said inner end of said valve core member is provided with an annular shoulder and said biasing means comprises a helical coil spring.

* * * * *